(12) United States Patent
Woodland et al.

(10) Patent No.: US 11,674,491 B2
(45) Date of Patent: Jun. 13, 2023

(54) SYSTEMS AND METHODS FOR PROVIDING GROUND FAULT PROTECTION ON DIRECT CURRENT POWER FEEDS OF ENGINE COMPONENTS

(71) Applicant: Cummins Power Generation Inc., Minneapolis, MN (US)

(72) Inventors: Lane Woodland, Eden Prairie, MN (US); Randall J. Johnson, Columbus, IN (US); Sagar Sharma, Columbus, IN (US); Elias M. Ayana, Minneapolis, MN (US); Michael Fegley, Minneapolis, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 17/859,806

(22) Filed: Jul. 7, 2022

(65) Prior Publication Data

US 2023/0012380 A1    Jan. 12, 2023

Related U.S. Application Data

(60) Provisional application No. 63/219,573, filed on Jul. 8, 2021.

(51) Int. Cl.
*F02N 11/08*     (2006.01)
*F02N 11/10*     (2006.01)
*F02N 11/04*     (2006.01)

(52) U.S. Cl.
CPC ............ *F02N 11/108* (2013.01); *F02N 11/04* (2013.01); *F02N 2200/062* (2013.01)

(58) Field of Classification Search
CPC ..... F02N 11/04; F02N 11/08; F02N 2200/062
USPC ................ 123/179.3, 179.4, 179.25, 179.28; 701/112, 113; 290/38 R, 40 E, 40 F
See application file for complete search history.

(56) References Cited

FOREIGN PATENT DOCUMENTS

| AD | 2014281335 | * | 1/2016 | .............. F02N 11/08 |
|---|---|---|---|---|
| EP | 3 148 029 A1 | | 3/2017 | |
| GB | 2 008 872 A | | 6/1979 | |
| WO | WO-2006/127915 A2 | | 11/2006 | |
| WO | WO-2010/113917 A1 | | 10/2010 | |
| WO | WO-2018/158942 A1 | | 9/2018 | |

OTHER PUBLICATIONS

Search Report from GB 2209695.2, dated Nov. 17, 2022, 4 pages.

\* cited by examiner

*Primary Examiner* — Hai H Huynh
(74) *Attorney, Agent, or Firm* — Foley & Lardner LLP

(57) ABSTRACT

Systems and methods of providing fault protection on direct current (DC) feeds to various engine or generator set components are provided. In some embodiments, generator set includes a ground fault device arranged between a DC power distribution circuit and a subsystem of the generator set. The ground fault device is configured to detect a fault condition based on a comparison of a first current in a first wire with a second current in a second wire between the DC power distribution circuit and the subsystem. In response to detecting the fault condition, the ground fault device is configured to disconnect the subsystem.

20 Claims, 4 Drawing Sheets

SYSTEMS AND METHODS FOR PROVIDING GROUND FAULT PROTECTION ON DIRECT CURRENT POWER FEEDS OF ENGINE COMPONENTS

CROSS REFERENCE TO RELATED APPLICATION

This application claims the benefit of and priority to U.S. Provisional Application Ser. No. 63/219,573, entitled "SYSTEMS AND METHODS FOR PROVIDING GROUND FAULT PROTECTION ON DIRECT CURRENT POWER FEEDS OF ENGINE COMPONENTS," filed Jul. 8, 2021, which is incorporated herein by reference in its entirety.

TECHNICAL FIELD

The present disclosure relates generally to electric power transmission. More particularly, the present disclosure relates to systems and methods for ground fault protection on direct current power feeds to smart electric subsystems and/or components on engines or generator sets.

BACKGROUND

On an engine or generator set, a distribution power circuit may provide direct current (DC) power to one or more components of the generator set. For example, a battery may supply DC power to a DC power distribution box and/or circuit of the generator set. The DC power distribution box may then be coupled to and provide DC power to various subsystems of the generator set. The DC power distribution box may include a fuse or current breaker to prevent open circuit faults. However, the generator set may be susceptible to other faults that the fuse or circuit breaker are unable to detect or prevent.

SUMMARY

One implementation is related to a generator set, the generator set includes a power source, a distribution circuit coupled to the power source, a first subsystem coupled to the distribution circuit and configured to receive DC power via a first wire and a second wire, a first switch connected in series on the first wire, and a controller circuit coupled to the first switch, the controller circuit configured to detect a fault condition at the first subsystem based on a first current in the first wire and a second current in the second wire and selectively control the first switch based thereon.

In some embodiments, to detect the fault condition, the controller circuit is configured to compare a magnitude of the first current with a magnitude of the second current, and determine that the magnitude of the first current is greater than the magnitude of the second current at least by a predetermined threshold.

In some embodiments, the predetermined threshold is in the range of 0.01 amps to 0.05 amps.

In some embodiments, the controller circuit is configured to open the first switch in response to detecting the fault condition.

In some embodiments, the generator system also includes a second subsystem coupled to the distribution circuit and configured to receive DC power via a third wire and a fourth wire, and a second switch connected in series on the first wire, the second switch selectively controlled via the control circuit or a second controller circuit, wherein the controller circuit is configured to detect a fault condition at the second subsystem based on a third current in the third wire and a fourth current in the fourth wire.

In some embodiments, the controller circuit is configured to detect the fault condition at the second subsystem by comparing a magnitude of the third current with a magnitude of the fourth current, and determining that the magnitude of the third current is greater than the magnitude of the fourth current at least by a predetermined threshold.

In some embodiments, the generator system also includes a controller configured to disable the generator system in response to the fault condition and provide a notification of the fault condition via a display.

In some embodiments, the generator system also includes a first current detector positioned to detect the first current on the first wire, the first current detector coupled to the controller circuit, and a second current detector positioned to detect the second current on the second wire, the second current detector coupled to the controller circuit.

Another implementation is related to a ground fault device for a subsystem of an engine and/or generator set, the ground fault device includes a housing configured to be mounted to a generator system, a first input terminal configured to be coupled to a first DC terminal of the generator system, a first output terminal configured to be coupled to a first DC terminal of a subsystem of the generator system, wherein the first input terminal and first output terminal are coupled together via a switch, a second input terminal configured to be coupled to a second DC terminal of the generator system, a second output terminal configured to be coupled to a second DC terminal of the subsystem of the generator system, wherein the second input terminal and second output terminal are coupled together, and a controller circuit coupled to the switch, the controller circuit configured to detect a fault condition at the subsystem and open the switch in response to detecting the fault condition.

In some embodiments, the controller circuit is configured to detect the fault condition by comparing a magnitude of a first current between the first input terminal and the first output terminal with a magnitude of a second current between the second input terminal and the second output terminal, and determining that the magnitude of the first current is greater than the magnitude of the second current at least by a predetermined threshold.

In some embodiments, the predetermined threshold is in the range of 0.01 amps to 0.05 amps.

In some embodiments, the ground fault device includes a first current detector positioned to detect the first current, the first current detector coupled to the controller circuit, and a second current detector positioned to detect the second current, the second current detector coupled to the controller circuit.

In some embodiments, the controller is further configured to transmit a signal to disable the generator system in response to the fault condition and provide a notification of the fault condition via a display.

Yet another implementation is related to a method, the method includes receiving electrical power at a direct current (DC) distribution circuit of a generator system, providing DC power to a subsystem from the DC distribution circuit via a first wire and a second wire, comparing a first current of the first wire with a second current of the second wire, detecting a fault condition based on the comparison of the first current and the second current, and responsive to detecting the fault condition, disconnecting the DC power to the first subsystem.

In some embodiments, the method further includes providing a notification of the fault condition via a display on the generator system.

In some embodiments, the method further includes detecting the first current with a first current detector in series with the first wire, and detecting the second current with a second current detector in series with the second wire.

In some embodiments, the comparing the first current with the second current comprises comparing a magnitude of the first current with a magnitude of the second current.

In some embodiments, the detecting the fault condition comprises determining that the magnitude of the first current is greater than the magnitude of the second current at least by a predetermined threshold.

In some embodiments, receiving, by a second subsystem coupled to the distribution circuit, DC power via a third wire and a fourth wire, selectively controlling a second switch connected in series on the first wire, and detecting a fault condition at the second subsystem based on a third current in the third wire and a fourth current in the fourth wire.

In some embodiments, the method also includes comparing a magnitude of the third current with a magnitude of the fourth current, and determining that the magnitude of the third current is greater than the magnitude of the fourth current at least by a predetermined threshold.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for providing ground fault protection on DC feeds to various engine or generator set subsystems/components is provided according to exemplary embodiments. A system includes a DC distribution box and one or more subsystems (e.g., components) of an engine (e.g., a generator set). The DC distribution box may be coupled to one or more power sources such as a battery and/or alternator. In some embodiments, the DC distribution box may include a fuse, circuit breaker, and/or other circuitry such as a rectifier, a voltage regulator, and so on. The DC distribution box is coupled to the one or more subsystems via a positive cable (e.g., a first electrical cable or wire) and a negative cable (e.g., a second electrical cable or wire). In some embodiments, the fuse or circuit breaker may be configured to open (e.g., trip) if a current provided to positive cable is above a pre-defined threshold (e.g., 20 amps).

In applications where the positive and negative cables may be supplying DC power to a fuel subsystem (e.g., a fuel pump) of the generator set, care must be taken to avoid potentially hazardous situations. Accordingly, the devices, circuitry, and methods described herein are able to detect arcing events or other fault conditions and cause the generator set or engine to fault before damage or a fire can occur. For example, in an embodiment, a ground fault circuit may be positioned or arranged between the DC power distribution box and the subsystem that detects a ground fault at the subsystem and trips a circuit breaker to interrupt the source of power to and halt any arcing prior to damage of the subsystem. In this way, the generator set is able to proactively prevent sustained arcing events.

Figure 1:
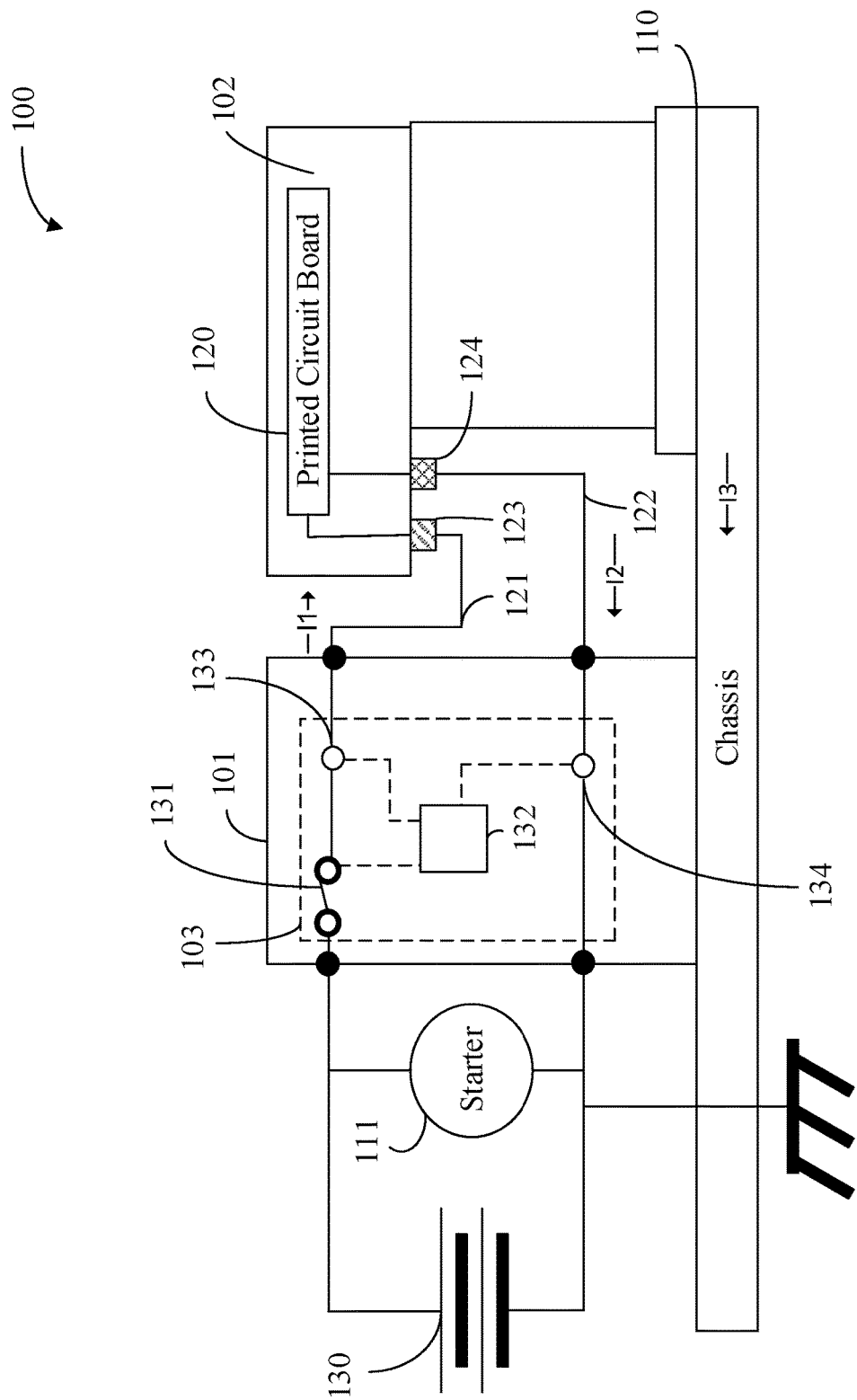
FIG. 1 is a block diagram illustrating a generator set according to an exemplary embodiment.

Referring to FIG. 1, a block diagram illustrating a generator set 100 is shown according to an exemplary embodiment. The generator set 100 includes a DC distribution box 101, a first subsystem 102, and a power source 130. In some embodiments, the DC distribution box 101, the first subsystem 102, a ground fault circuit 103, and/or the power source 130 may be mechanically coupled to or affixed to chassis 110 of the generator set 100. The chassis 110 may include various components or portions and formed of metal and/or other rigid material. The chassis 110 may be coupled to ground to prevent any static electricity from forming on the chassis 110 and thereby reduce potential for shocks or other electrical hazards. In some embodiments, the power source 130 may be coupled to various components of the generator set 100. For example, the power source 120 may be coupled to a starter 111 of the generator set 100. In some embodiments, the power source 130 may include a battery (e.g., a 24 volt battery), an alternator (e.g., having a rectifier), and/or any other electrical power source.

The DC distribution box 101 is mechanically and electrically coupled to the power source 101 and receives electrical power (e.g., direct current and/or alternating current power) at a first set of input terminals. The DC distribution box 101 includes various circuitry components in order to distribute DC power to one or more subsystems such as the first subsystem 102. For example, the DC distribution box 101 may include one or more fuses, voltage regulators, rectifiers, controllers, and so on that allow for the DC distribution box 101 to receive electrical power from the power source 130 and distribute the electrical power at predetermined characteristics (e.g., voltage) to the one or more subsystems. In an embodiment, the DC distribution box 101 supplies DC power to the first subsystem 102 via a first cable 121 (e.g., a positive cable/wire) and a second cable 122 (e.g., a negative cable/wire). In some embodiments, the first cable 121 and the second cable 122 connect to the first subsystem 102 via a first connector 123 and a second connector 124, respectively. For example, the first connector 123 may be designed to couple the first cable 121 to a first terminal (e.g., a first ring terminal) of the first subsystem 102 and the second connector 124 may be designed to couple the second cable 122 to a second terminal (e.g., a second ring terminal) of the first subsystem 102.

The first subsystem 102 may include a printed circuit board 120 and other circuitry to perform a pre-defined function. For example, the first subsystem 102 may include drives, motors, pumps, controllers, and so on that enable the first subsystem 102 to perform the pre-defined function within the system. The pre-defined function may include a cooling function to an engine of the generator set 100, a fuel-supply function to the engine of the generator set 100, and/or other functions that are necessary for operation of the generator set 100. In an embodiment, the first cable 121 and the second cable 122 are coupled to respective terminals of the printed circuit board 120 in order to supply the DC power to the first subsystem 102. However, in some embodiments, the connections of the first cable 121 and the second cable 122 may be susceptible to fault conditions that may cause arcing events.

The ground fault circuit 103 is designed to detect a ground fault on the electrical power being supplied from the DC distribution box 101 to the first subsystem 102. In some embodiments, the ground fault circuit 103 may be included within the DC power distribution box 101. Alternatively or additionally, the ground fault circuit 102 may be a separate kit or device from the DC power distribution box 101. In an embodiment, the ground fault circuit 102 includes a first switch 131 positioned as part of the first cable 121. In other embodiments, the first switch 121 may be connected between a terminal of the DC distribution box 101 and the first cable 121. The first switch 131 is coupled to a controller circuit 132. The controller circuit 132 is configured to selectively open and close the first switch 131 such that power can be selectively provided to the first subsystem 102 via the first switch 131 and the controller circuit 110. The ground fault circuit 103 also includes a first current detector 133 positioned to read/detect a first current ($I_1$) on the first cable 121 and a second current detector 134 positioned to read/detect a second current ($I_2$) on the second cable 122. The first current detector 133 and the second current detector 134 are coupled to the controller circuit 132.

The controller circuit 132 receives a reading of the first current ($I_1$) and the second current ($I_2$) and controls the first switch 131 based on a magnitude of the first current ($I_1$) and the second current ($I_2$). For example, if a magnitude of the first current ($I_1$) is within a predetermined threshold (0.05 amps) from a magnitude of the second current ($I_2$) the controller circuit 132 may not open the first switch 131. However, if the difference between the magnitude of the first current ($I_1$) and the magnitude of the second current ($I_2$) is greater than the predetermined threshold (0.05 amps), then the controller circuit 132 may open the first switch 131 to prevent electrical power from being supplied to the first subsystem 102. In some embodiments, the predetermined threshold may be set and/or adjustable via a user input. In some embodiments, the magnitude of the first current ($I_1$) being greater than the magnitude of the second current ($I_2$) may indicate to the controller circuit 132 that a fault condition (e.g., a ground fault) is present. For example, the magnitude of the first current ($I_1$) being greater than the magnitude of the second current ($I_2$) may indicate that a portion of the current (e.g., the difference between $I_1$ and $I_2$) being supplied to the first subsystem 102 is being transmitted to ground via a third current ($I_3$) via the chassis 110, which may be indicative of an arcing event.

In some embodiments, the controller circuit 132 may also be communicably coupled to a master controller of the generator set. Upon opening the first switch 131, the controller circuit 132 may send a notification or a fault message to the master controller. In some embodiments, the generator set 100 and/or master controller may automatically detect when the first switch 131 is opened and cause a fault notification to be displayed on a panel of the generator set and/or transmit a message to a personal computing device associated with an administrator of the generator set 100. The generator set 100 may be manually reset before subsequent operation and the notification may indicate to the administrator that an arcing event and/or ground fault has occurred. In this way, the ground fault circuit 132 is able to detect ground faults with particularity (e.g., small ground faults above the predetermined threshold at particular subsystems) and prevent hazards and/or damage to the generator set 100 components.

Figure 2:
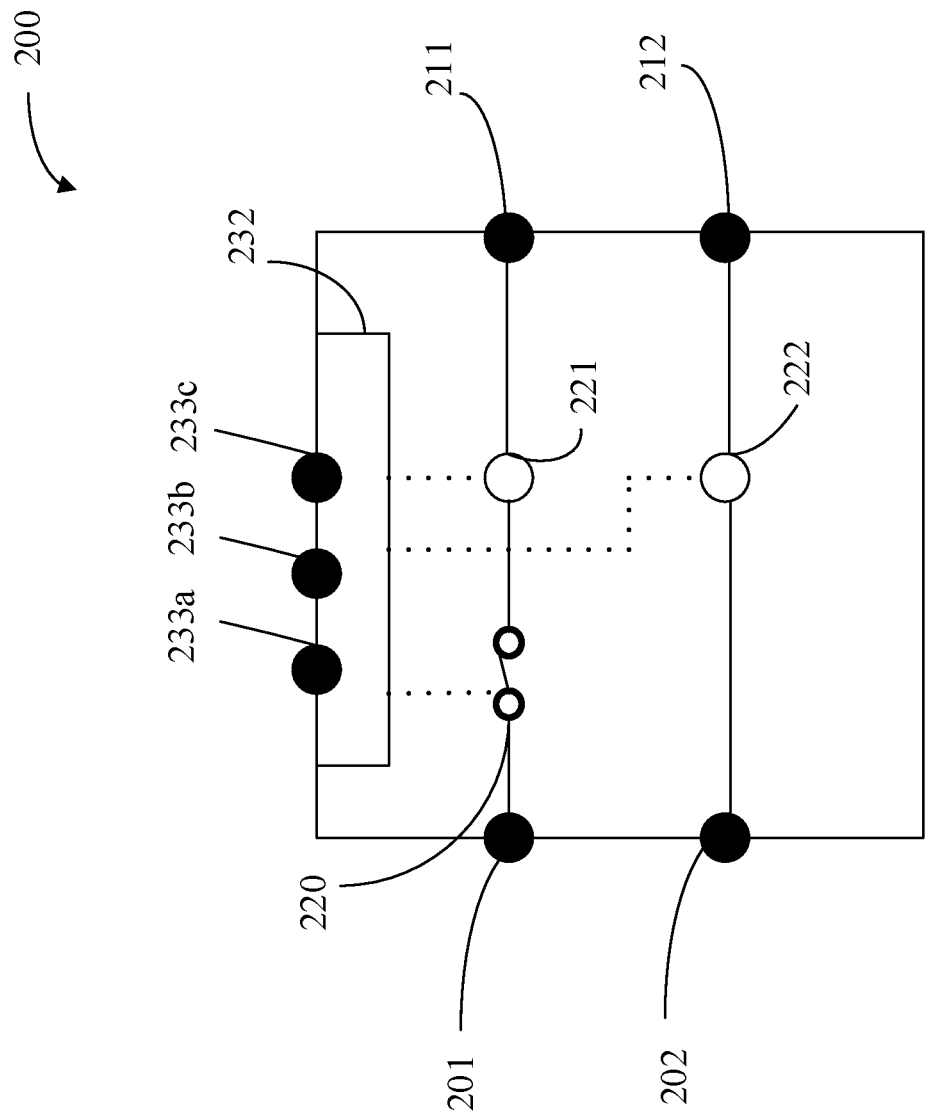
FIG. 2 is a schematic diagram of a ground fault detection device for a subsystem of an engine and/or generator set according to an exemplary embodiment.

Referring to FIG. 2, a schematic diagram of a ground fault circuit 200 (e.g., ground fault detection device) for a subsystem of an engine and/or generator set is shown according to an exemplary embodiment. In some embodiments, the ground fault circuit 200 may be part of DC distribution box 101, as depicted in reference to FIG. 1. In other embodiments, the ground fault circuit 200 may be a standalone device or kit having a housing and configured to be positioned between the distribution box 101 and a subsystem (e.g., the first subsystem 101). For example, the housing may be designed to be mounted to the generator set or engine (e.g., the chassis) and designed to be integrated with existing generator sets between the DC power supply and one or more of the various subsystems.

The ground fault circuit 200 may include a first input terminal 201 designed to be coupled to a positive terminal of the DC distribution box (e.g., a positive DC voltage terminal) and a second input terminal 202 designed to be coupled to a negative terminal of the DC distribution box (e.g., a negative DC voltage terminal). The ground fault circuit 200 may include a first output terminal 211 designed to be coupled to a positive terminal of a subsystem of the generator set and a second output terminal 212 designed to be coupled to a negative terminal of the subsystem. The first input terminal 201 is coupled to the first output terminal 211 via a switch 220. The second input terminal 202 is coupled to the second output terminal 212.

The ground fault circuit 200 may include a first current detector 221 configured to detect a first current between the first input terminal 201 and the first output terminal 211 and a second current detector 222 configured to detect a second current between the second input terminal 202 and the second output terminal 212. In some embodiments, the ground fault circuit 200 includes a controller circuit 232 coupled to the switch 220, the first current detector 221, and the second current detector 222. In various embodiments, the controller circuit 232 may be coupled to a power source. For example, the ground fault circuit 200 may include one or more batteries configured to supply power to the controller circuit 232. In some embodiments, the controller circuit 232 may include one or more terminals configured to be coupled to an external power source and/or coupled to a communications terminal of another controller. Alternatively or additionally, the ground fault circuit 200 may include a transceiver coupled to the controller circuit 232 that is able to wirelessly communicate with personal devices and/or other controllers of a generator set via, for example, BLUETOOTH® or other wireless communications protocol.

The controller circuit 232 is designed to compare the first current detected via the first current detector 221 with the second current detected via the second current detector 222 and selectively open and/or close the switch 220 based thereon. For example, the controller circuit 232 may compare a first magnitude of the first current with a second magnitude of the second current. The controller circuit 232 may open the switch 220 if the first magnitude is greater than the second magnitude by a pre-defined threshold. In some embodiments, the pre-defined threshold is determined, set, and/or adjusted via a user input based on an application of the ground fault circuit 200. For example, the pre-defined threshold may be on the order of milli-amps (mA) or smaller, but not limited there to. In this way, the ground fault circuit is able to disconnect power from a subsystem experiencing a potential fault with particularity, which ensures that small faults are detected before the small faults can grow into larger faults.

Figure 3:
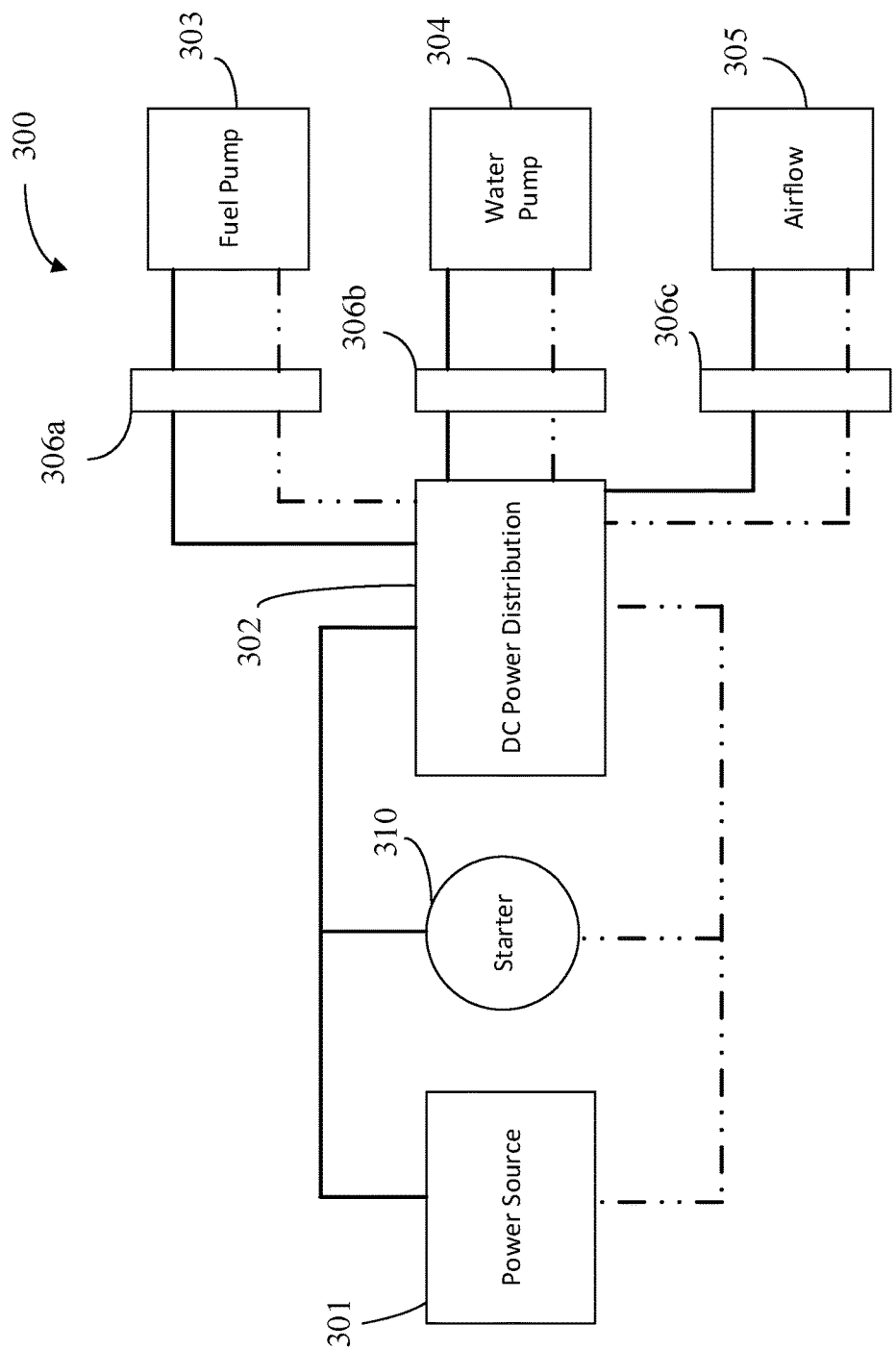
FIG. 3 is a schematic diagram of a generator set having various subsystems according to an exemplary embodiment.

Referring to FIG. 3, a schematic diagram of a generator set 300 having various subsystems is shown according to an exemplary embodiment. The generator set 300 includes a power source 301, a DC power distribution circuit 302 (e.g., DC power distribution box), a first subsystem 303, a second subsystem 304, and a third subsystem 305. The power source 101 is coupled to input terminals of the DC power distribution circuit 302. In some embodiments, the power source 101 may also be connected to other devices of the generator set directly such as a starter circuit 310. For example, the starter circuit may be configured 310 to start an engine of the generator set.

The DC power distribution circuit 302 is configured to receive electrical power from the power source 101 and distribute DC power to the respective subsystems 303, 304, and 305. In some embodiments, the generator set 300 may include additional or fewer subsystems 303, 304, and 305. In the example depicted, the first subsystem 303 is a fuel pump system, the second subsystem 304 is a water pump system, and the third subsystem 305 is a fan or airflow system. It is to be appreciated that this example is for illustration purposes only and that in alternative embodiments the subsystems may include other types of subsystems. Each of the subsystems 303, 304, and 305 are configured to receive DC power from the DC power distribution circuit via respective terminals and wires.

Each of the subsystems 303, 304, and 305 are configured to receive DC power from the DC power distribution circuit via respective terminals and wires (e.g., positive and negative wires/cables). The generator set 300 includes a ground fault circuit 306a-c coupled between each of the subsystems 303, 304, and 305 and the DC power distribution circuit 302. The ground fault circuits 306a-c may be similar to the ground fault circuits described in reference to FIGS. 1 and 2 above. In this configuration, the generator set 300 is able to precisely detect ground faults at the subsystems 303, 304, and 305 via the ground fault circuits 306a-c, which ensures that any small faults are detected and managed. In some embodiments, each of the ground fault circuits 306a-c may be communicably coupled to a system controller of the generator set such that, when a fault is detected, the system controller is able to turn off the generator set and notify a user of the location of the detected fault based on which ground fault circuit 306a-c detected a fault and disconnected power to the respective subsystem. In some embodiments, the ground fault circuits 306a-c may share one or more control circuits or have respective control circuits to monitor for faults and control the respective switches.

Figure 4:
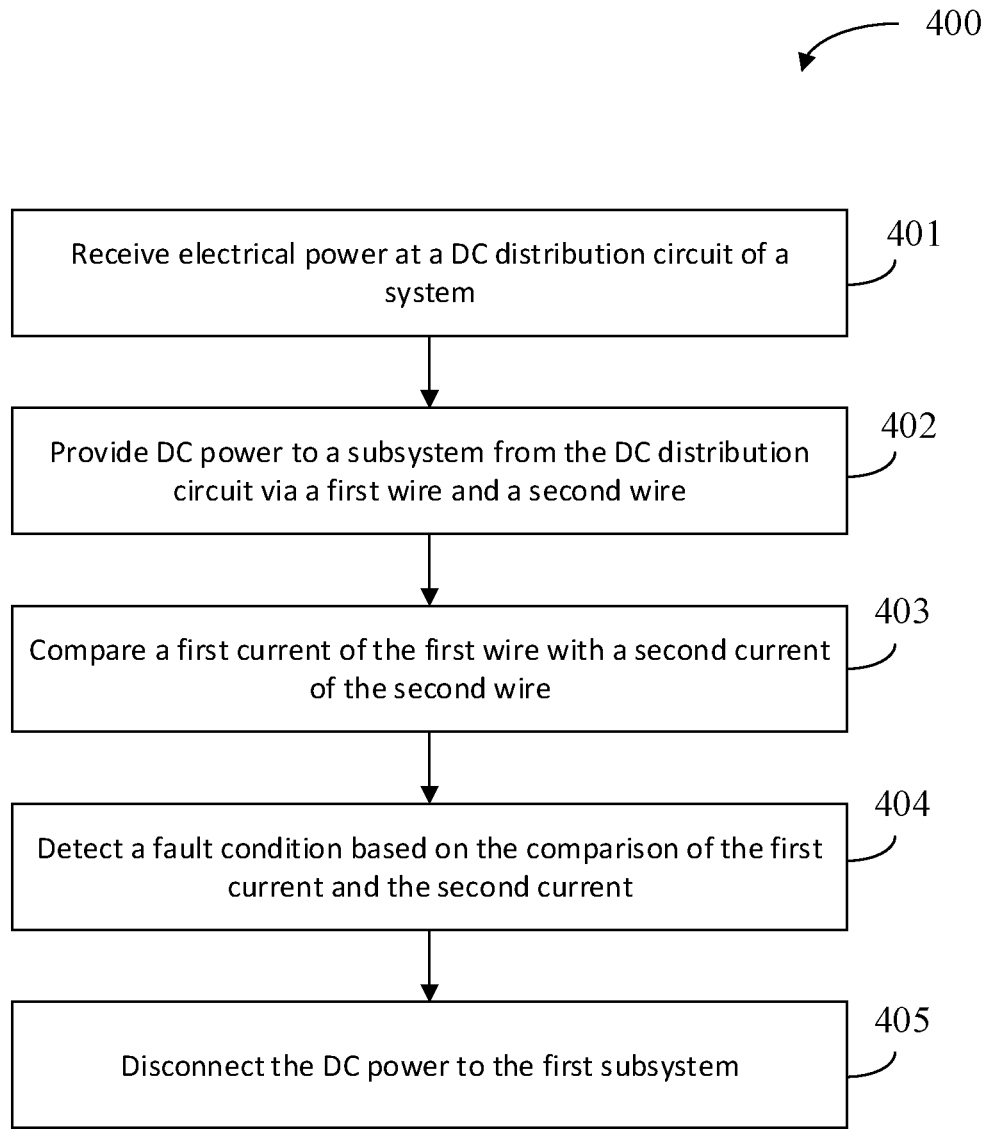
FIG. 4 is a flow diagram of a method of detecting a ground fault to a subsystem of a generator set according to an exemplary embodiment.

Referring to FIG. 4, a flow diagram of a method 400 of detecting a ground fault to a subsystem of a generator set is shown according to an exemplary embodiment. The method 400 may be performed by a controller (e.g., controller circuit 132). The method 400 allows for a system (e.g., an engine system, generator system, generator set 100) to detect fault conditions.

In an operation 401, a DC distribution circuit of the system receives electrical power from one or more power sources. For example, the DC distribution circuit may receive electrical power from the one or more power sources (e.g., batteries) via a first and second input terminal. The DC distribution circuit may condition the electrical power and provide DC power having particular characteristics (e.g., voltage characteristics) to a subsystem via a first wire (e.g., at a positive terminal) and a second wire (e.g., at a negative terminal) at operation 402. In some embodiments, the first wire is coupled to a first terminal of a controller circuit (e.g., a printed circuit board) of the subsystem and the second wire is coupled to a second terminal of the controller circuit of the subsystem.

In an operation 403, a first current flowing through the first wire is compared to a second current flowing through the second wire. In some embodiments, the first and second currents are compared by a controller circuit of the generator set or a controller circuit of a ground fault circuit. In various embodiments, a first magnitude of the first current is compared with a second magnitude of the second current. If the first and second magnitude are the same, then no fault is detected. In various other embodiments, other comparisons between the first and second currents may be performed.

In an operation 404, the controller circuit detects a fault condition based on the comparison of the first current and the second current. For example, the first magnitude may be determined by the controller circuit to exceed the second magnitude by a pre-set threshold (e.g., 0.05 A), which may indicate a fault condition. The fault condition may be that a ground fault is occurring at the subsystem. For example, since the first magnitude is exceeding the second magnitude, the controller circuit may determine that power (e.g., current) is leaking to ground somewhere in the subsystem. Additionally, the current faulting to ground may be causing an arcing event (e.g., a plasma arc) within the subsystem that, if not detected, may cause heating and damage to components of the subsystem.

In an operation 405, the DC power is disconnected from the first subsystem. For example, in some embodiments, the controller circuit may open a switch on the first wire that disconnects the power to the subsystem. In some embodiments, the controller circuit may cause the system to shut down thereby disconnecting power to all of the subsystems. In various embodiments, the controller circuit may open a switch between the power source and the DC distribution circuit thereby disconnecting power to all of the subsystems. Alternatively or additionally, the controller circuit may cause a notification to be transmitted to a display of the system or a personal device associated with a user of the system. The notification may indicate the user or maintenance personnel that a fault is present on the particular subsystem thereby allowing them to check the connections to the subsystem and/or reset the system for future operations.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A generator system comprising:
   a power source;
   a distribution circuit coupled to the power source;
   a first subsystem coupled to the distribution circuit and configured to receive DC power via a first wire and a second wire;
   a first switch connected in series on the first wire; and
   a controller circuit coupled to the first switch, wherein the controller circuit is configured to detect a fault condition at the first subsystem based on a first current in the first wire and a second current in the second wire and selectively control the first switch based thereon.

2. The system of claim 1, wherein to detect the fault condition, the controller circuit is configured to compare a magnitude of the first current with a magnitude of the second current, and determine that the magnitude of the first current is greater than the magnitude of the second current at least by a predetermined threshold.

3. The system of claim 2, wherein the predetermined threshold is in the range of 0.01 amps to 0.05 amps.

4. The system of claim 1, wherein the controller circuit is configured to open the first switch in response to detecting the fault condition.

5. The system of claim 1, further comprising:
   a second subsystem coupled to the distribution circuit and configured to receive DC power via a third wire and a fourth wire; and a second switch connected in series on the first wire, the second switch selectively controlled via the control circuit or a second controller circuit, wherein the controller circuit is configured to detect a fault condition at the second subsystem based on a third current in the third wire and a fourth current in the fourth wire.

6. The system of claim 5, wherein the controller circuit is configured to detect the fault condition at the second subsystem by comparing a magnitude of the third current with a magnitude of the fourth current, and determining that the magnitude of the third current is greater than the magnitude of the fourth current at least by a predetermined threshold.

7. The system of claim 1, further comprising a controller configured to disable the generator system in response to the fault condition and provide a notification of the fault condition via a display.

8. The system of claim 1, further comprising:
a first current detector positioned to detect the first current on the first wire, the first current detector coupled to the controller circuit; and
a second current detector positioned to detect the second current on the second wire, the second current detector coupled to the controller circuit.

9. A ground fault device for use in a generator system, the ground fault device comprising:
a housing configured to be mounted to a generator system;
a first input terminal configured to be coupled to a first DC terminal of the generator system;
a first output terminal configured to be coupled to a first DC terminal of a subsystem of the generator system, wherein the first input terminal and first output terminal are coupled together via a switch;
a second input terminal configured to be coupled to a second DC terminal of the generator system;
a second output terminal configured to be coupled to a second DC terminal of the subsystem of the generator system, wherein the second input terminal and second output terminal are coupled together; and
a controller circuit coupled to the switch, the controller circuit configured to detect a fault condition at the subsystem and open the switch in response to detecting the fault condition.

10. The device of claim 9, wherein the controller circuit is configured to detect the fault condition by comparing a magnitude of a first current between the first input terminal and the first output terminal with a magnitude of a second current between the second input terminal and the second output terminal, and determining that the magnitude of the first current is greater than the magnitude of the second current at least by a predetermined threshold.

11. The device of claim 9, wherein the predetermined threshold is in the range of 0.01 amps to 0.05 amps.

12. The device of claim 9, further comprising:
a first current detector positioned to detect the first current, the first current detector coupled to the controller circuit; and
a second current detector positioned to detect the second current, the second current detector coupled to the controller circuit.

13. The device of claim 9, wherein the controller is further configured to transmit a signal to disable the generator system in response to the fault condition and provide a notification of the fault condition via a display.

14. A method of detecting ground faults on a subsystem of a generator system, the method comprising:
receiving electrical power at a direct current (DC) distribution circuit of a generator system;
providing DC power to a subsystem from the DC distribution circuit via a first wire and a second wire;
comparing a first current of the first wire with a second current of the second wire;
detecting a fault condition based on the comparison of the first current and the second current; and
responsive to detecting the fault condition, disconnecting the DC power to the first subsystem.

15. The method of claim 14, further comprising providing a notification of the fault condition via a display on the generator system.

16. The method of claim 14, further comprising:
detecting the first current with a first current detector in series with the first wire; and
detecting the second current with a second current detector in series with the second wire.

17. The method of claim 14, wherein the comparing the first current with the second current comprises comparing a magnitude of the first current with a magnitude of the second current.

18. The method of claim 17, wherein the detecting the fault condition comprises determining that the magnitude of the first current is greater than the magnitude of the second current at least by a predetermined threshold.

19. The method of claim 14, further comprising:
receiving, by a second subsystem coupled to the distribution circuit, DC power via a third wire and a fourth wire;
selectively controlling a second switch connected in series on the first wire; and
detecting a fault condition at the second subsystem based on a third current in the third wire and a fourth current in the fourth wire.

20. The method of claim 19, further comprising:
comparing a magnitude of the third current with a magnitude of the fourth current; and
determining that the magnitude of the third current is greater than the magnitude of the fourth current at least by a predetermined threshold.

* * * * *